S. S. Day,
Insect Trap,
N° 30,619. Patented Nov. 13, 1860.
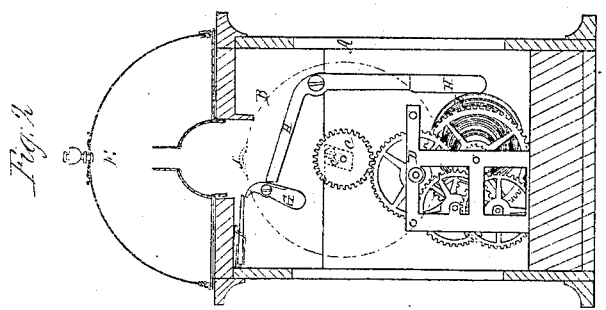
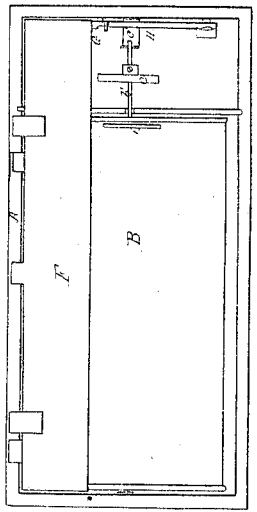
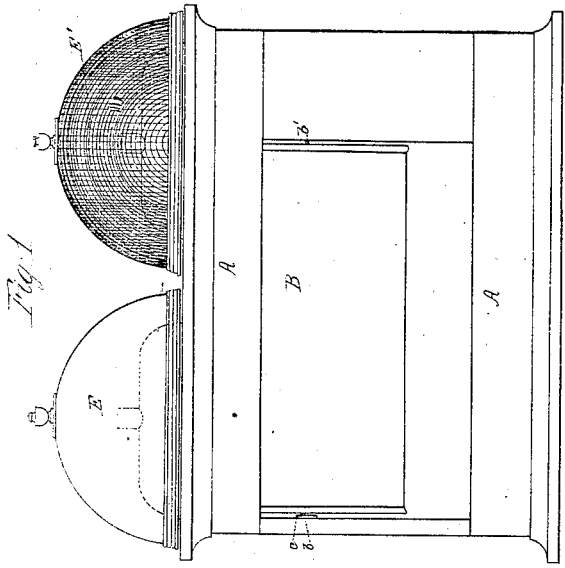
Witnesses
Inventor:
Samuel S. Day

UNITED STATES PATENT OFFICE.

SAMUEL S. DAY, OF NEW YORK, N. Y.

FLY-TRAP.

Specification of Letters Patent No. 30,619, dated November 13, 1860.

*To all whom it may concern:*

Be it known that I, SAMUEL S. DAY, of New York, in the county and State of New York, have invented, made, and applied to use certain new and useful Improvements in Fly-Traps; and I do declare the following to be a full, clear, and correct description of the same, reference being had to the accompanying drawings, and to the letters of reference marked thereon, in which—

Figure I, is a front view of the fly-trap made by me. Fig. II, a view of the clockwork by which the operative parts of the trap are operated—also a view of the lever and pawl for lowering the shelf as hereinafter described. Fig. III, a top view of my improvements as applied to a fly-trap in which a roller or cylinder operated by clockwork is used.

In the drawings like parts of the invention are designated by similar letters of reference.

The nature of the invention made by me consists in the use or employment of a shelf operated as hereinafter set forth, by which means the flies which shall have collected on the roller or cylinder and been carried around upon the same and driven into a cage or cages prepared for their reception, are retained in the same and prevented from escaping therefrom, after the cylinder has ceased rotating.

To enable those skilled in the art to make and use my invention I will proceed to describe the construction and operation of the same.

A represents a box provided on either side with an opening for the admission of the flies.

B shows a cylinder hung transversely in the box A, and covered with cloth or other suitable material. This cylinder B is provided at either end with spindles $b$ and $b'$, one resting in bracket $c$ and the other in bracket $c'$; upon spindle $b'$ is placed the cog-wheel C, gearing into a clock-movement D, placed at one end of the box A, and by which the roller B and the improvements added by me are operated.

E and E' are two cages of wire placed directly on the top of the box A, and provided with oblong openings covered with wire or perforated tin, having a tube at their centers, through which the flies enter when driven from the cylinder or roller B. When filled with flies the cages E and E' can be removed from the box A and the flies destroyed in any manner desired.

F shows a flat shelf extending very nearly across the box A, to the upper edge of which it is hinged, so that it may be elevated or depressed at pleasure. When elevated, a sufficient space is left between the inner edge of the shelf F and the cylinder or roller B for the flies to pass unmolested to the cages E and E'; when depressed, the inner edge of the same falls and rests upon the roller or cylinder B, thus preventing the escape of the flies from the cages E and E'.

G is a catch or drop attached to the inner end of box A by means of a screw in such a manner as to swing freely to and fro.

H is a lever attached to the inner end of box A in the same manner as drop or catch G, the shorter end of which is directly behind the drop or catch G, below its point of pivoting. The longer end is made heavier and falls in a direct line with the spring I, by which the clock-movement D is operated.

J shows a semi-circular lifter placed upon the roller or cylinder B at one end, by which the shelf F is operated as hereinafter set forth.

Attached to the cover placed over the box, is a strip of wood projecting downward nearly to the cylinder or roller B, which serves to start the flies from said cylinder or roller B, to drive them into the cages E and E' and prevent their escape either while the cylinder or roller B is in motion or has ceased to rotate. The cylinder or roller B may be baited with molasses or any other substance suitable for the purpose; the clock-movement D wound up, by which motion is communicated to the train of wheels of which the same is made up; the cog-wheel C placed on spindle $b'$ of cylinder or roller B gearing into this clock-movement, the cylinder or roller B is caused to rotate. The flies having been attracted to the roller or cylinder B, are carried around upon the same until they reach the start, which dislodges them from the roller or cylinder B, and drives them into the cages E and E' placed directly above. During the rotation of the roller or cylinder B, the shelf F rests directly upon the drop or catch G. As the spring I of the clock-movement D expands, it approaches nearer and nearer to the lever H until it finally comes in contact with the same and throws it out of position; the long end of the lever H thus receiving a backward motion presses the short end of the same against the lower and longer end of the drop or catch G, just below its pivoting point and trips the shelf F, which falls directly upon the roller or cylinder B as hereinbefore set forth. Upon the rewinding of the clock movement D, the roller or cylinder is set in motion; the lever H resumes its proper position, likewise the drop or catch G is relieved. As the roller or cylinder B rotates the semi-circular lifter J comes in contact with the front edge of the shelf F, raises the same sufficiently high for the upper end of the drop or catch G to pass under it, and drops it upon the same, in which position it remains until the clock-movement D again runs down. By the use or employment of my improvement as herein described the escape of the flies from the cages E and E' is completely prevented, after the cylinder or roller B has ceased to rotate.

I am fully aware that Fuller and Pearce have obtained a patent for the cylinder or roller which shall rotate, when the same is used in combination with a box or cage. Having been licensed by these parties to use their invention, I lay no claim to their invention.

What I claim as my invention and desire to secure by Letters Patent is—

The use or employment of the shelf F in combination with the lever H, catch G, spring I and lifter J, when the same shall be combined and operated in the precise manner herein specified or by means substantially the same or in an equivalent manner.

SAMUEL S. DAY.

In presence of—
SIDNEY A. JEWETT,
A. SIDNEY DOANE.